No. 767,408. PATENTED AUG. 16, 1904.
P. C. HEWITT.
STARTING DEVICE FOR VAPOR ELECTRIC APPARATUS.
APPLICATION FILED MAY 28, 1903.
NO MODEL.
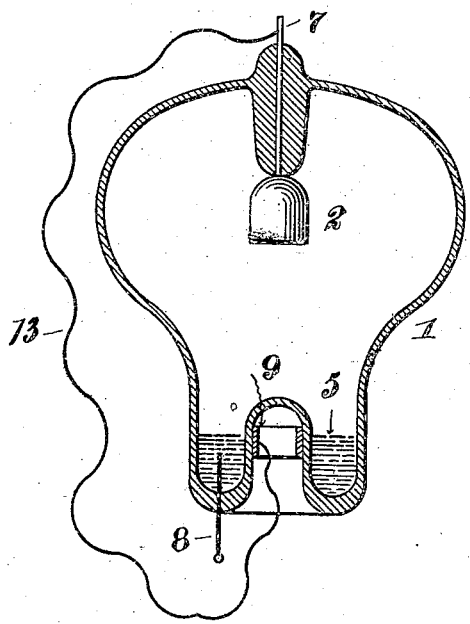
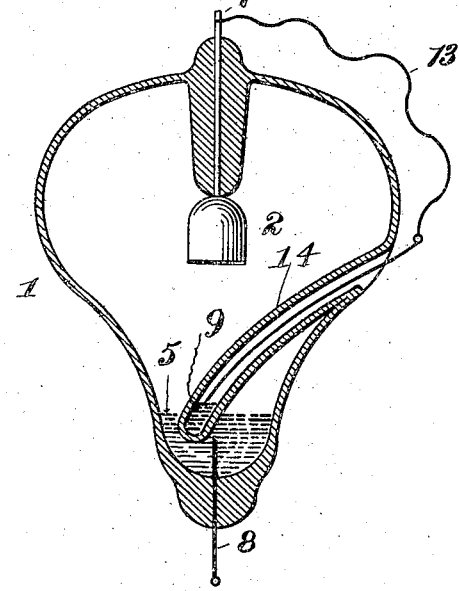
WITNESSES:
INVENTOR
BY
ATTORNEY No. 767,408. Patented August 16, 1904.

UNITED STATES PATENT OFFICE.

PETER COOPER HEWITT, OF NEW YORK, N. Y., ASSIGNOR TO COOPER HEWITT ELECTRIC COMPANY, A CORPORATION OF NEW YORK.

STARTING DEVICE FOR VAPOR ELECTRIC APPARATUS.

SPECIFICATION forming part of Letters Patent No. 767,408, dated August 16, 1904.

Application filed May 28, 1903. Serial No. 159,108. (No model.)

*To all whom it may concern:*

Be it known that I, PETER COOPER HEWITT, a citizen of the United States, and a resident of New York, county of New York, State of New York, have invented certain new and useful Improvements in Starting Devices for Vapor Electric Apparatus, of which the following is a specification.

In connection with the gas or vapor electric apparatus which was patented to me under various forms and embodiments on the 17th day of September, 1901, there was shown and described what was called a "starting-band" in proximity to the negative electrode. This starting-band may assume various forms, as is now well understood in the art. The startting-band disclosed in the patent referred to was located outside the container, within which both the positive and negative electrode of the apparatus were inclosed.

I have found that the function of the starting-band will be performed whether it is located outside or inside the material constituting the negative electrode, and the present invention is concerned with a starting-band which is internal with respect to the said electrode.

My invention is illustrated in the accompanying drawings, in which—

Figures 1 and 2 are vertical sections of different embodiments of my invention.

Naturally the invention may assume many forms, and those here shown are simply given by way of illustration.

In the drawings, 1 is a container, within which are electrodes 2 and 5, connected, respectively, with leading-in wires 7 and 8. The positive electrode 2 may be of iron or some other suitable substance or material, while the negative electrode 5 may conveniently be of mercury or some material which will undergo disintegration by the action of the electric current, which disintegrated portions will eventually return and re-form as the electrode. In proximity to the negative electrode and usually projecting somewhat above the level of the upper surface thereof I place a starting-band 9, which in Fig. 1 is represented as a strip of metallic foil or may consist of a metallic paint either in the form of a complete ring or in the form of one or more strips of foil or paint, as the case may be.

I generally connect the "starting-band," so-called, with the positive side of the circuit, as by a wire 13, running to the leading-in wire 7.

The starting-band 9 in Fig. 1 is internal with respect to the material of the negative electrode by reason of the fact that the container is made of reëntrant form at the bottom, and the starting-band is applied to the inner side of the reëntrant portion in substantially the position indicated in the drawings.

In Fig. 2 I show a tube 14 running in from the outer wire of the container 1 and dipping slightly below the surface of the mercury or other material constituting the other electrode, 5. In this instance I show the starting-band in the form of a drop of mercury in the bottom of the tube 14, having found that this form of starting-band operates well in practice.

By "starting-band" is meant any conductor which may perform the function of a starting-band and in use creates a state of electric stress at the required point, but is not for the purpose of transmitting current.

I claim as my invention—

In a gas or vapor device of the character described, a container, a negative electrode of conducting material within the container, a reëntrant portion of the container arranged to enter the negative electrode, and a starting-band within the reëntrant portion.

Signed at New York, in the county of New York and State of New York, this 25th day of May, A. D. 1903.

PETER COOPER HEWITT.

Witnesses:
   WM. H. CAPEL,
   GEORGE H. STOCKBRIDGE.